United States Patent Office 3,258,233
Patented June 28, 1966

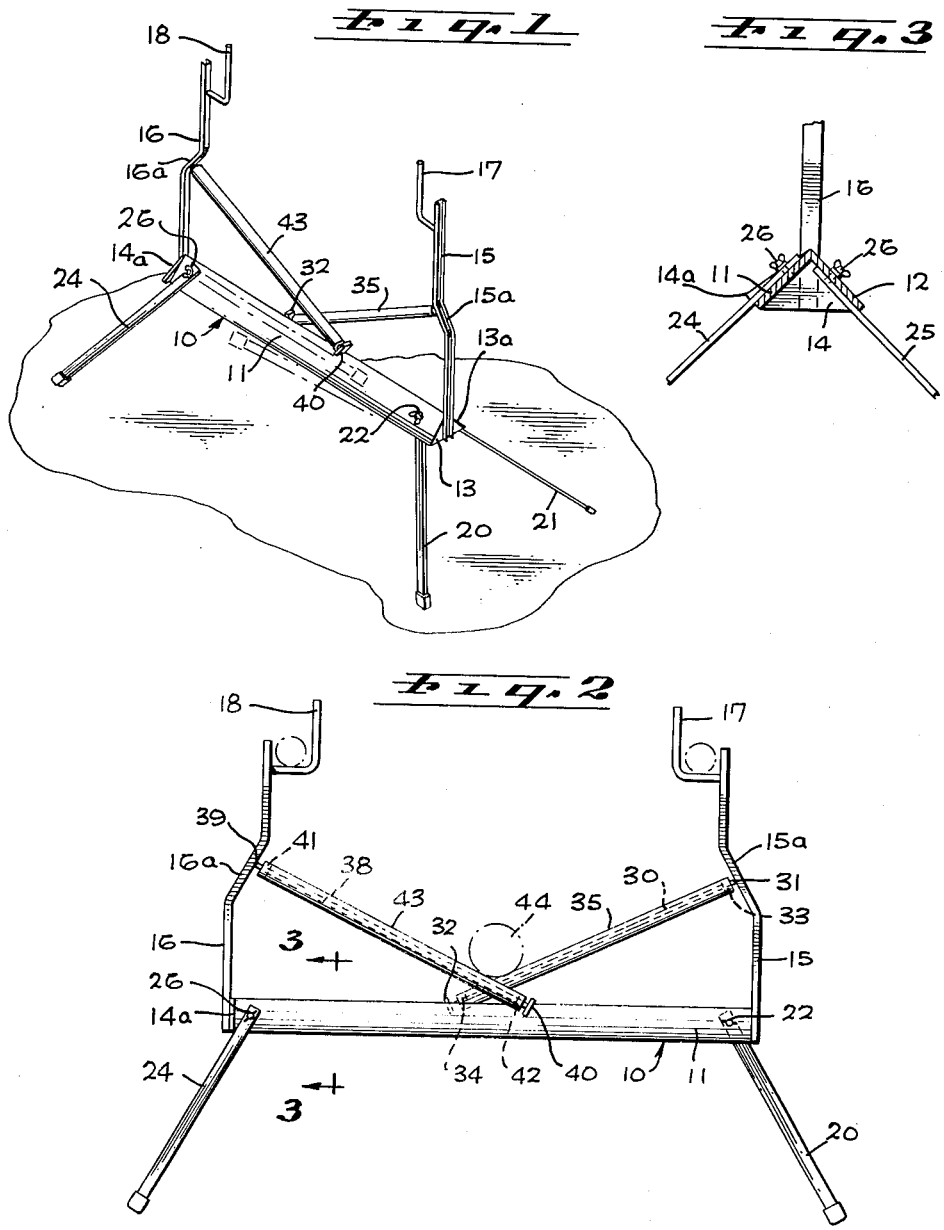

3,258,233
CABLE SUPPORT DEVICE
John M. Grantham, Canoga Park, Calif., assignor to Grantham & Oleson Electrical Contractors, Inc., Venice, Calif., a corporation of California
Filed Feb. 24, 1965, Ser. No. 434,800
4 Claims. (Cl. 248—55)

This invention relates to a cable support device and more particularly to a support for cable as it is pulled off a cable drum.

When long lengths of cable, such as a hundred foot lengths, are pulled off a cable drum, the cable must be supported every ten feet or so and it has been the practice to employ men stationed at these intervals to hold the cable off the ground so that it can be continually pulled off the drum. In the alternative, a plurality of pulley sheaves can be placed at spaced locations along the cables to support the cable as it is pulled off the drum and permit the cable to be pulled by a single operator. The use of pulley sheaves presents a difficulty in guiding the cable since the cable is not positively centered on each of the sheaves as it is removed from the drum. Also, after a full cable length has been unwound and cut, the cable must be removed from the sheaves and placed on the ground before the next length can be measured off.

The cable support of the present invention provides a device which replaces the pulley sheaves and which gives a positive centering action for the cable as it is pulled outwardly from the drum over each of the support devices. The cable support utilizes a pair of rollers which are crossed at their lower ends so that the cable, as it is pulled over the rollers, moves towards the lowest crossing point and the cable is therefore always centered on each of the support devices. Each cable support has separate brackets for supporting cable lengths independently of the roller so that after a cable length is cut, it can be placed on the brackets so that the next length can be pulled over the rollers. Thus, a cable length does not have to be taken off the support device and placed on the ground but can remain on the support device while another cable length is measured off.

It is therefore an object of the present invention to provide a cable support device in which the cable can be pulled over the device as it is removed from a drum and on which the cable will be always centered by passing over crossed rollers.

Another object of the invention is to provide a cable support on which previously cut cable lengths can be supported while additional cable lengths are pulled over the supports.

Another object of the invention is to provide a cable support device which can be folded into a compact package for easy handling in the field and which has the stability required because of the weight of the cable.

These and other objects of the invention not specifically set forth above will become readily apparent from the accompanying description and drawings in which:

FIGURE 1 is a perspective view of the cable support device showing the extended and folded leg positions;

FIGURE 2 is a side elevational view showing the cross rollers for centering the cable and the uprights for supporting additional cable lengths; and FIGURE 3 is a vertical section along line 3—3 showing the base member to which the legs are attached.

Referring to the embodiment of the invention chosen for purposes of illustration, the cable support device consists of a base member 10 which is in the shape of an inverted V-trough and has sides 11 and 12 and ends 13 and 14. Upright support members 15 and 16 are secured to ends 13 and 14, respectively, and have angular portions 15a and 16a, respectively. Cable support brackets 17 and 18 are secured to the top of the members 15 and 16, respectively, and project inwardly therefrom to provide support for two additional lengths of cable.

A pair of legs 20 and 21 are secured to sides 11 and 12, respectively, of base member 10 by means of bolts 22. The upper end of leg 20 is located on the inside of side 11 while the upper portion of leg 21 is secured on the outside of side 12. The legs 20 and 21 extend outwardly and downwardly and the leg 20 can abut the inside of the end 13 while the leg 21 can abut projection 13a extending above the end 13 so that the legs will not be permitted to collapse by extending beyond a certain amount. In a similar manner, legs 24 and 25 are connected to base member 10 adjacent the end 14 and the upper end of leg 24 is connected to the outside surface of leg 11 while the upper end of leg 25 is connected to the inside surface of leg 12 by means of the bolts 26. The legs 24 and 25 project outwardly and downwardly and the end 14 acts as a stop for a leg 25 while the projection 14a on end 14 serves as a stop for the leg 24. As illustrated by the dashed lines in FIGURE 1, the legs can be folded up tightly against the base mmeber 10 since the legs 20 and 25 will fold up along the inside of the base member whereas the legs 21 and 24 will fold up along on the outside of the base memebr. After the legs have been folded, the bolts 22 and 26 can be tightened to hold them in the folded position.

A first roller shaft 30 is connected at end 31 to the upright portion 15a and is connected at the other end to end piece 32 which in turn is secured in any suitable way to the side 11 of the base member 10. The shaft 30 supports ballbearings 33 and 34 at opposite ends and the bearings rotatably mount a hollow roller 35. A second roller shaft 38 has end 39 connected to frame section 16a and the other end connects to end piece 40 which in turn is attached to the side 12 of the member 10. The shaft 38 supports ballbearings 41 and 42 at opposite ends thereof in order to mount a second hollow roller 43. As illustrated in FIGURE 2, the lower ends of the rollers cross at a location slightly above base member 10 so that as cable 44 is pulled over the rollers, it will be centered by gravity at the lowest crossing point of the rollers without additional drag being placed upon the cable.

As the cable is pulled from the drum, the support device can be placed at intervals along the cable and each support device provides a positive centering action for the cable 44 as it is pulled from a drum since the cable moves towards the cross point of the rollers 35 and 43. Also, since the legs extend outwardly from each end of the base member 10, the legs provide stability as the cable is being pulled over the cable supports and prevent the supports from tipping over. After a full length of the cable is measured off and the cable is severed, the severed piece of cable can be lifted off the rollers and placed on the brackets 17 of all the cable supports located along the cable length. A second length of cable can then be pulled over the cable supports and then cut to proper length. After the second length has been measured off, it can be removed from the rollers and placed upon the other cable brackets 18. Finally, a third length of cable can be pulled over the rollers to the desired length and cut and thereafter the other two pieces can be placed back on the rollers if so desired. If desired, additional brackets could be added to the uprights to support additional pieces of cable.

The cable support of the present invention therefore provides a light, sturdy support for cables and provides a positive centering action as the cable is pulled from a drum. Also, the cable support permits easy handling of more than one cable length pulled from a single drum. Although a particular embodiment of the invention has been illustrated and described, it will be obvious to those skilled in the art that various changes and modifications may be made without departing from the invention and it is intended to cover in the appended claims, all such modifications and equivalents as fall within the true spirit and scope of this invention.

What is claimed is:
1. A cable support device comprising:
   an elongated base member;
   an upright member extending upwardly from each end of said base member;
   cable support bracket means located at the upper portion of each member;
   a roller extending angularly from each upright member down to said base member;
   said rollers crossing at their lower portions in order to provide a cross point for continually centering the cable as it is pulled over the roller from a drum; and
   said bracket means being located to receive and support a cut length of cable.
2. A cable support as defined in claim 1 wherein each of said upright members has an angular portion extending toward the center of said base member and each of said rollers having one end supported by said angular portion and other end supported by said base member.
3. A cable support as defined in claim 1 wherein:
   said base member has an inverted V-shape and is comprised of two sides and two end plates;
   a pair of legs located at each end of said base member with one leg connected to each side of said base member.
4. A cable support as defined in claim 3 wherein:
   one leg of each pair is connected to the inner side of different side members and another leg of each pair is connected to the outer side of different side members so that said legs can be folded snugly into said base member.

References Cited by the Examiner

UNITED STATES PATENTS

| | | | |
|---|---|---|---|
| 1,875,403 | 9/1932 | Young | 248—150 |
| 2,077,541 | 4/1937 | Wieslander | 248—166 |
| 2,550,793 | 5/1951 | Ferriera | 248—163 |
| 2,896,918 | 7/1959 | Ward | 248—439 X |
| 3,092,826 | 6/1963 | Klinger | 248—166 X |

FOREIGN PATENTS

| | | |
|---|---|---|
| 698,800 | 12/1964 | Canada. |
| 969,436 | 9/1964 | Great Britain. |
| 169,029 | 5/1934 | Switzerland. |

CLAUDE A. LE ROY, *Primary Examiner.*